(12) United States Patent
Micros

(10) Patent No.: US 10,671,065 B2
(45) Date of Patent: Jun. 2, 2020

(54) OPTICALLY ASSISTED LANDING AND TAKEOFF OF DRONES

(71) Applicant: Ioannis Micros, Athens (GR)

(72) Inventor: Ioannis Micros, Athens (GR)

( * ) Notice: Subject to any disclaimer, the term of this patent is extended or adjusted under 35 U.S.C. 154(b) by 13 days.

(21) Appl. No.: 14/525,041

(22) Filed: Oct. 27, 2014

(65) Prior Publication Data

US 2019/0204824 A1 Jul. 4, 2019

(51) Int. Cl.
| | | |
|---|---|---|
| *G05D 1/00* | (2006.01) | |
| *B64C 39/02* | (2006.01) | |
| *G06F 3/01* | (2006.01) | |
| *G05D 1/06* | (2006.01) | |
| *G05D 1/10* | (2006.01) | |

(52) U.S. Cl.
CPC ......... *G05D 1/0033* (2013.01); *B64C 39/024* (2013.01); *G05D 1/0016* (2013.01); *G05D 1/0022* (2013.01); *G05D 1/0676* (2013.01); *G05D 1/101* (2013.01); *G06F 3/013* (2013.01); *G06F 3/017* (2013.01); *B64C 2201/146* (2013.01)

(58) Field of Classification Search
CPC .... G05D 1/0033; G05D 1/101; G05D 1/0022; G05D 1/0016; G05D 1/0676; G06F 3/013; G06F 3/017; B64C 39/024; B64C 2201/146; B64C 13/00; B64C 19/00; B64C 29/00; A63H 30/00; B64D 47/00
See application file for complete search history.

(56) References Cited

U.S. PATENT DOCUMENTS

| | | | | |
|---|---|---|---|---|
| 7,548,697 B2* | 6/2009 | Hudson | .................. | A63H 30/04 398/106 |
| 7,843,431 B2* | 11/2010 | Robbins | ............... | G05D 1/0016 345/161 |
| 8,019,223 B2* | 9/2011 | Hudson | .................. | A63H 30/04 398/106 |
| 8,108,092 B2* | 1/2012 | Phillips | ................ | G05D 1/0033 701/23 |
| 8,199,109 B2* | 6/2012 | Robbins | ............... | G05D 1/0016 345/161 |

(Continued)

OTHER PUBLICATIONS

A. Couture-Beil, R. Vaughan and G. Mori, "Selecting and Commanding Individual Robots in a Multi-Robot System," in Proc. 2010 Canadian Conference Computer and Robot Vision (Year: 2010).*

(Continued)

*Primary Examiner* — Peter D Nolan
(74) *Attorney, Agent, or Firm* — Franco S. De Liguori; DP IP Group

(57) ABSTRACT

The present disclosure describes a system to facilitate the landing of drones including an eye tracker, an interpreter, and a control system configured to be worn by a person that performs coded moves of their arms and hands during a drone landing operation. In accordance with an exemplary embodiment, the eye tracker recognizes the line of sight of the person with respect to a drone, the interpreter identifies the coded moves performed by the person during landing of the drone, and the control system generates a signal to cause a transmitter to rotate into a position so as to establish a direct optical communication link to the drone to which is sent information relating to the identified coded moves.

19 Claims, 6 Drawing Sheets

(56) References Cited

U.S. PATENT DOCUMENTS

| | | | | |
|---|---|---|---|---|
| 8,214,098 B2 * | 7/2012 | Murray | ............ | A63H 30/04 |
| | | | | 382/103 |
| 8,218,006 B2 * | 7/2012 | De Mers | ............ | G02B 27/017 |
| | | | | 345/7 |
| 8,350,810 B2 * | 1/2013 | Robbins | ............ | G05D 1/0016 |
| | | | | 345/161 |
| 8,396,611 B2 * | 3/2013 | Phillips | ............ | G05D 1/0033 |
| | | | | 701/2 |
| 8,538,133 B2 * | 9/2013 | Moresve | ............ | B64F 1/20 |
| | | | | 382/153 |
| 8,760,397 B2 * | 6/2014 | Robbins | ............ | G05D 1/0016 |
| | | | | 345/156 |
| 8,843,244 B2 * | 9/2014 | Phillips | ............ | G05D 1/0038 |
| | | | | 701/2 |
| 9,038,938 B2 * | 5/2015 | Muren | ............ | A63H 27/12 |
| | | | | 244/4 R |
| 9,195,256 B2 * | 11/2015 | Robbins | ............ | G05D 1/0016 |
| 9,218,063 B2 * | 12/2015 | Galor | ............ | G06F 3/017 |
| 2008/0063400 A1 * | 3/2008 | Hudson | ............ | A63H 30/04 |
| | | | | 398/106 |
| 2009/0222149 A1 * | 9/2009 | Murray | ............ | A63H 30/04 |
| | | | | 701/2 |
| 2009/0232506 A1 * | 9/2009 | Hudson | ............ | A63H 30/04 |
| | | | | 398/106 |
| 2012/0076397 A1 * | 3/2012 | Moresve | ............ | B64F 1/20 |
| | | | | 382/153 |
| 2012/0140070 A1 * | 6/2012 | De Mers | ............ | G02B 27/017 |
| | | | | 348/144 |
| 2014/0217242 A1 * | 8/2014 | Muren | ............ | A63H 27/12 |
| | | | | 244/4 R |

OTHER PUBLICATIONS

A. Harris, J. Sluss Jr. and H. Refai, "Alignment and Tracking of a Free-space Optical Communication Link to a UAV," 14th Digital Avionics Systems Conference, Oct. 2010, pp. 1.C.2-1 thru 1.C.2-9 (Year: 2010).*

* cited by examiner

OPTICALLY ASSISTED LANDING AND TAKEOFF OF DRONES

CLAIM OF PRIORITY UNDER 35 U.S.C. § 119

The present Application for Patent claims priority to Greek Patent Application No. 20130100620 entitled "System and Method for Electronic Guidance of Drones for Landing/Take-off as well as Landing/Take-off from Marine Vehicle" filed Oct. 25, 2013, hereby expressly incorporated by reference herein.

BACKGROUND

Field

The present disclosure relates to the landing and take of of drones, generally, and in assisted landing and takeoff in particular.

Background

The process taking place during the first and the last phase of a mission of an aircraft based at an airport or at an aircraft carrier, namely primordial take-off to air and final landing to base, are well understood.

Current systems guide unmanned flying units (drones) achieve this by, on the part of the flyer, in every unit, providing a small artificial intelligence (AI) unit (hardware, software and database), a transponder, a remote control (RC) system, and actuators for these and for flight elements. The flyer handles the progress and success of the mission and with respect to take-off and landing in particular, the flyer also handles reception, elaboration and execution of RC signals. While video feedback during the progress of the mission is known, its use has not been commercially deployed for landing and take-off.

On the part of the guiding party, a small AI unit and some RC software, separate channels for the different drones, and radio-surveying the drone parts' functions are performed.

Concerning the guidance procedure for manned airplanes, the guiding party (the runway-person), i.e. the person giving the take-off/landing instructions by moving in coded way their body members, primarily hands and arms (hence the term hand signals), uses this method to visually communicate with human pilots of airplanes from the usual runway distances at take-off, and from close at the taxiway after landing and taxiing there. As such, there is no possibility so far to guide unmanned flyers by hand signals. From what has been detailed it is clear that the existing system is not adequate to meet the present-day needs in aviation, where quantities of drones enter the scene all the more intensely and this fact makes runway management of runways in airports, aerodromes and aircraft carriers all the more complicated. Airports, and particularly aircraft carrier runways, experience large number of departures and arrivals under conditions of stress, inadequate equipment and, as already stated, insufficient space and time.

SUMMARY

The present disclosure proposes a solution that interprets electronically hand and arm gestures into electric signals for internal elaboration and finally transforms them again into optical form and transmits them to the unmanned aircraft's receiving systems to be processed and executed.

More specifically, the disclosure achieves landing of drones using an eye tracker, an interpreter, and a control system configured to be worn by a person that performs coded moves of their arms and hands during a drone landing operation. In accordance with an exemplary embodiment, the eye tracker recognizes the line of sight of the person with respect to a drone, the interpreter identifies the coded moves performed by the person during landing of the drone, and the control system generates a signal to cause a transmitter to rotate into a position so as to establish a direct optical communication link to the drone to which is sent information relating to the identified coded moves.

In one scenario, the eye tracker is coupled to a camera and includes a semi-transparent frontal window-device that facilitates the person looking directly at the drone using a naked eye in one mode, and looking at the camera view in another mode In another scenario, the eye tracker is coupled to the camera via a reflective mirror. In one approach, the reflective mirror is configured to reflect an image in the eyeball view path of the person in the direction of the camera.

In yet another scenario, the signal transmitted via the direct optical communication link includes information which instructs an on-board control system in the drone on actions it should take in-flight which will stir the drone during landing.

In another scenario, the system also facilitates the takeoff of drones. The signal transmitted via the direct optical communication link includes further information which instructs an on-board control system in the drone on actions it should take during take-off.

In yet another scenario, the signal transmitted via the direct optical communication link includes information which instructs an on-board control system to fly in the direction of the source of lights detected by the drone while in landing mode.

In yet another solution, the sent information is in a form adapted to be processed by an auto-pilot system on the drone.

In yet another exemplary embodiment, a device for navigating the landing of drones is described which comprises a mechanism that receives video showing incoming drones over a landing space, a mechanism that identifies a user selection of a desired drone to be provided assisted landing, and a mechanism that generates a signal to cause a transmitter to rotate into a position and establish a direct optical communication link to the drone to which is sent information relating to coded moves.

On the drone end, the drone includes a mechanism that identifies a transmitted light from a ground source generally directed in the direction of the drone during landing, a mechanism that acknowledges the transmitted light, a mechanism that establishes a direct optical communication link with a ground source, and a mechanism that decodes information received over the direct optical communication link which information relates to coded moves of a person moving their arms and hands to assist the drone in landing and/or takeoff.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

DETAILED DESCRIPTION

Figure 1:
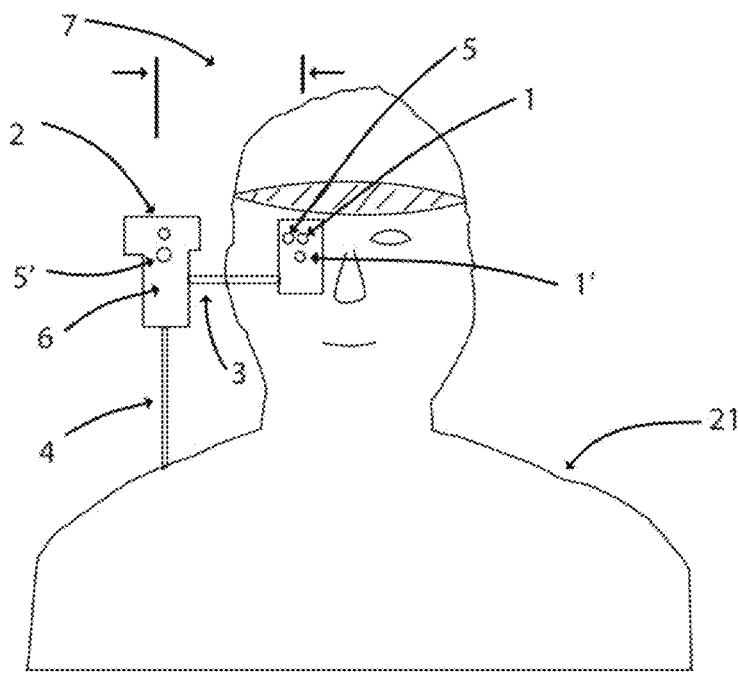
FIG. 1 shows equipment associated with person guiding the landing of a drone in accordance with an exemplary embodiment.
Figure 2:
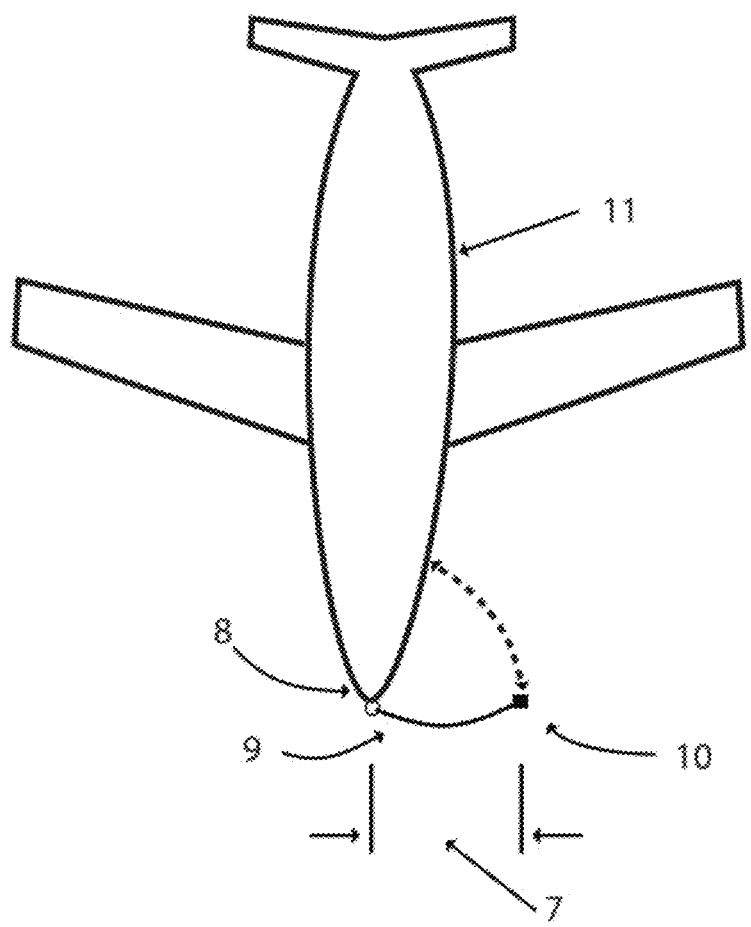
FIG. 2 shows an exemplary drone with equipment disposed for communicating with the equipment of person in FIG. 1.
Figure 3:
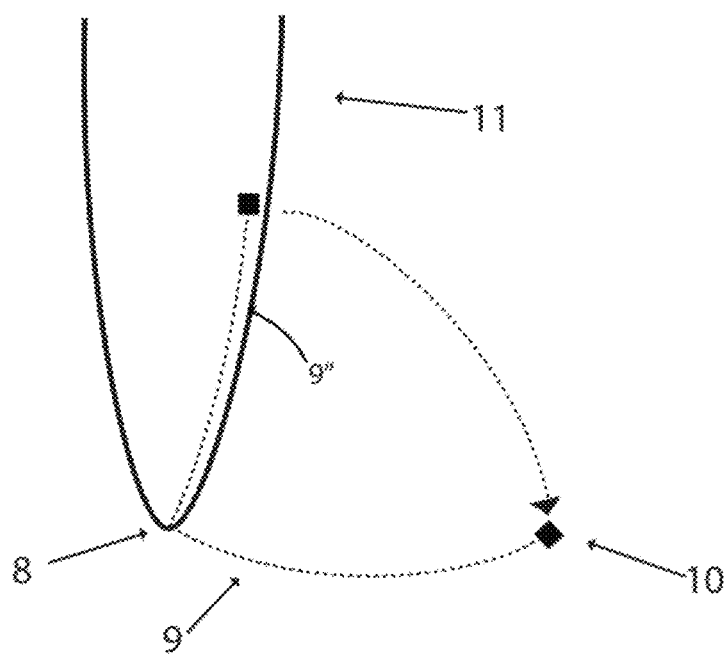
FIG. 3 shows idle and deployed positions of the external locator.
Figure 5:
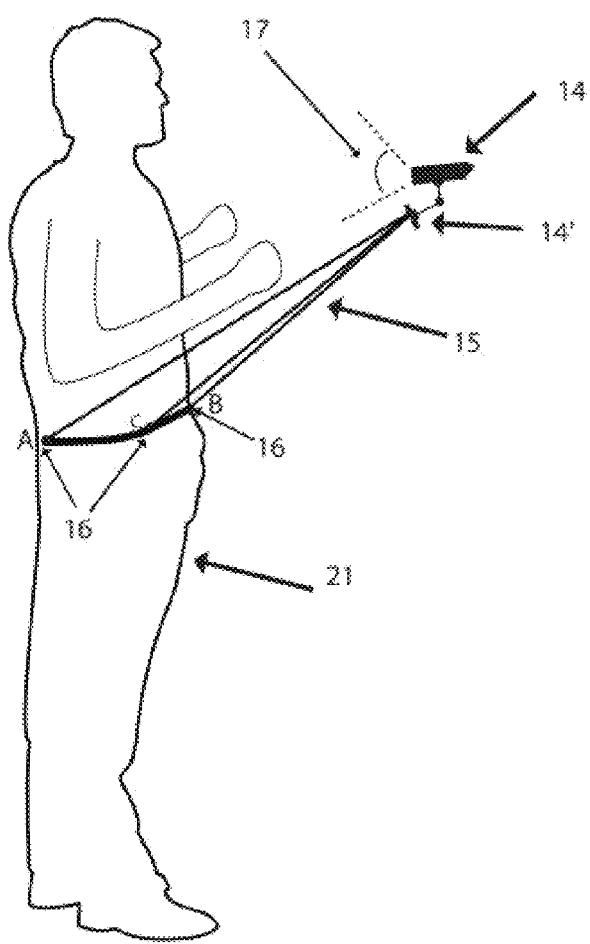
FIG. 5 shows the wait worn reader in accordance with an exemplary embodiment.
Figure 4:
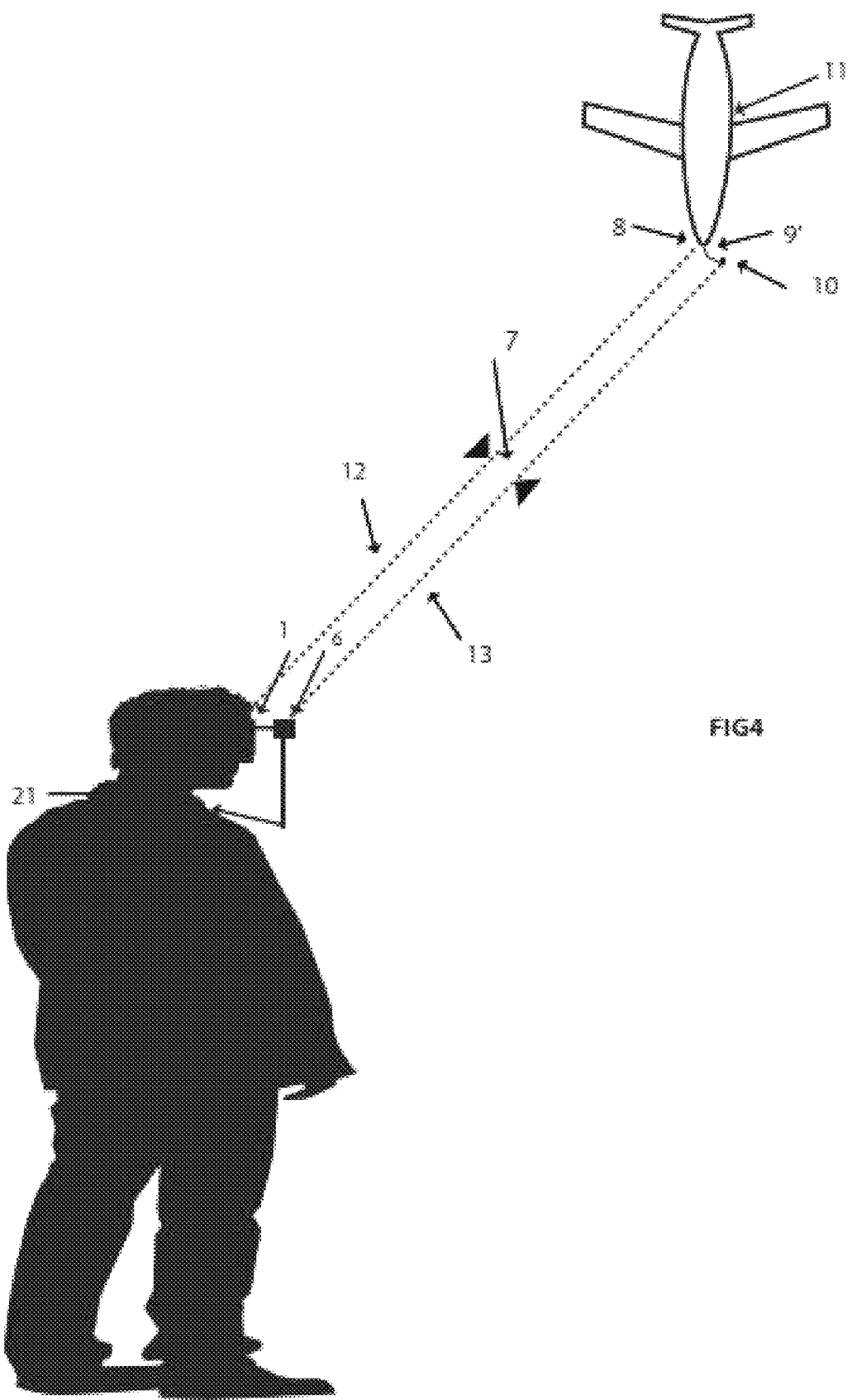
FIG. 4 is a high-level block diagram showing the exchange of light signals, and external locator's activated position.
Figure 6:
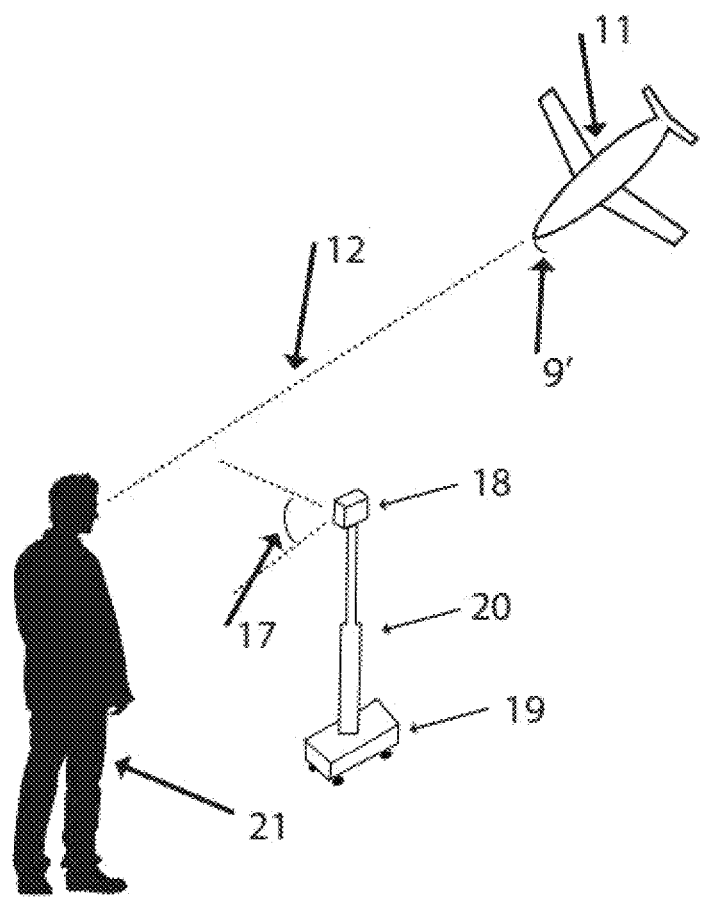
FIG. 6 shows a ground-based wheeled reader in accordance with an alternative exemplary embodiment.
Figure 7:
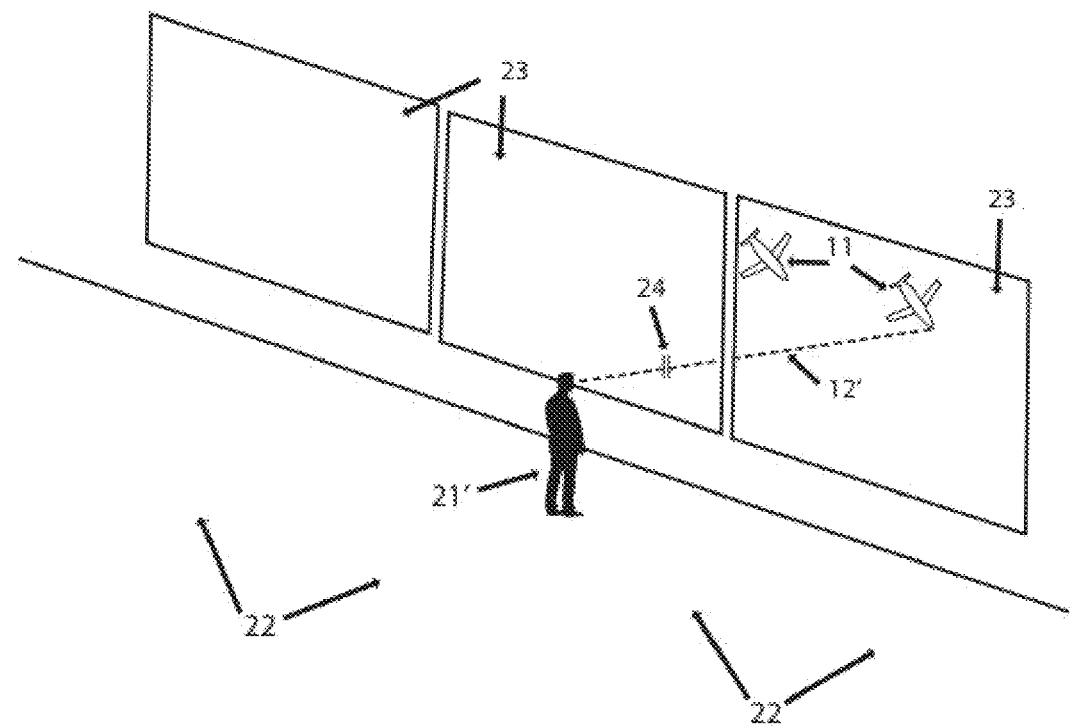
FIG. 7 shows a control room that is remotely located for guiding of drones in accordance with yet a further exemplary embodiment.
Figure 8:
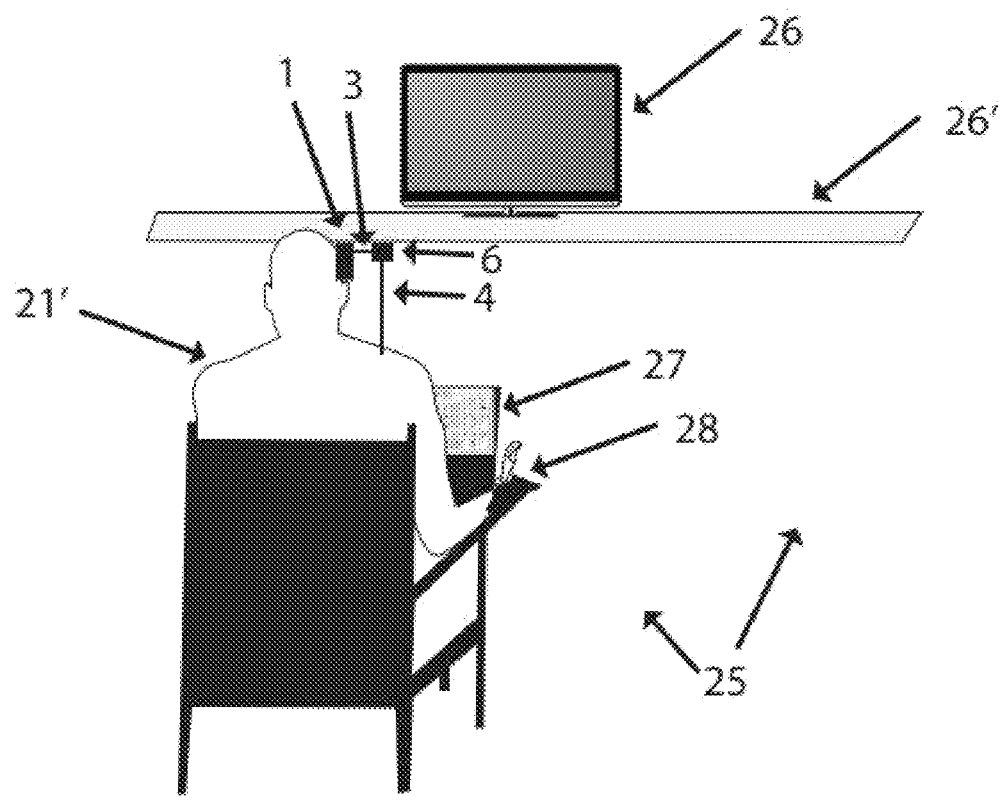
FIG. 8 shows a remote teller-guidance system.
Figure 9:
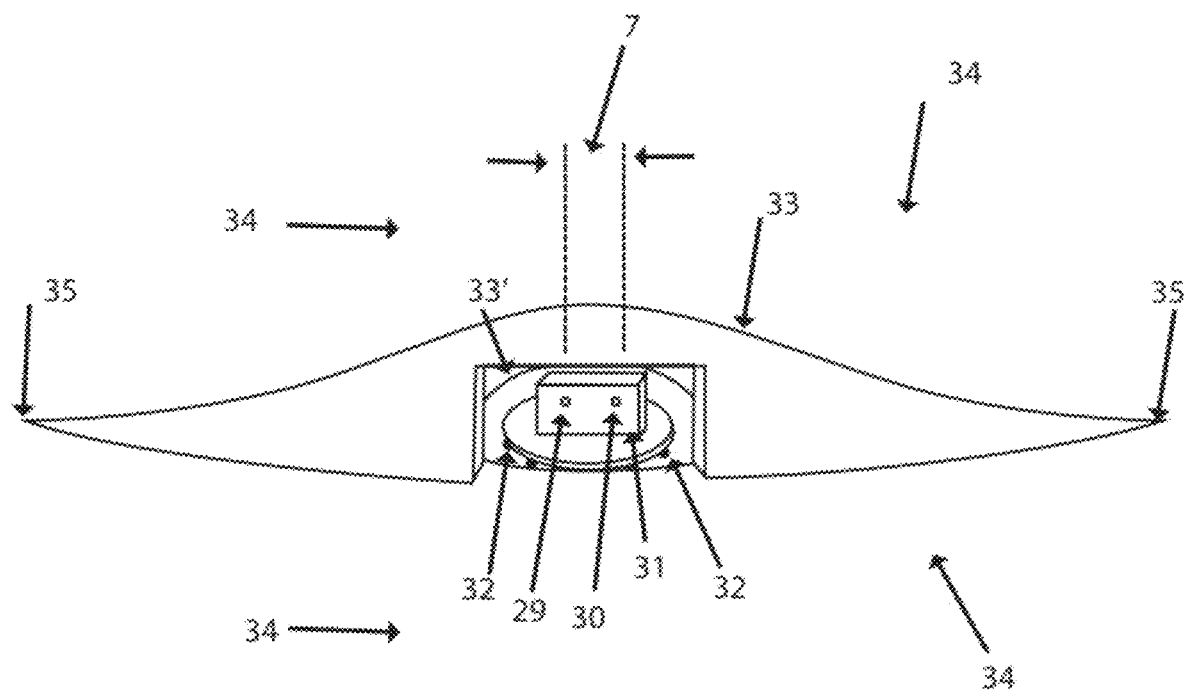
FIG. 9 shows a ground-embedded medium for tele-guidance and protective cover.
Figure 10B:
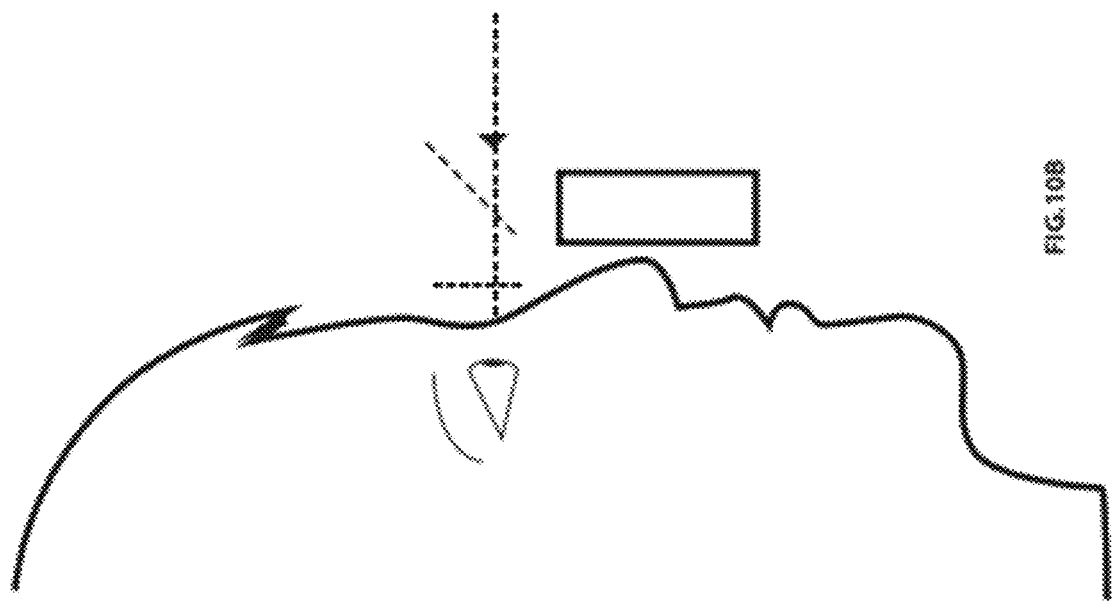
FIGS. 10A and 10B show an up close side perspective view of a person wearing an eye tracker coupled to an external video camera for camera non-enhanced and enhanced long range viewing, respectively.
Figure 10A:
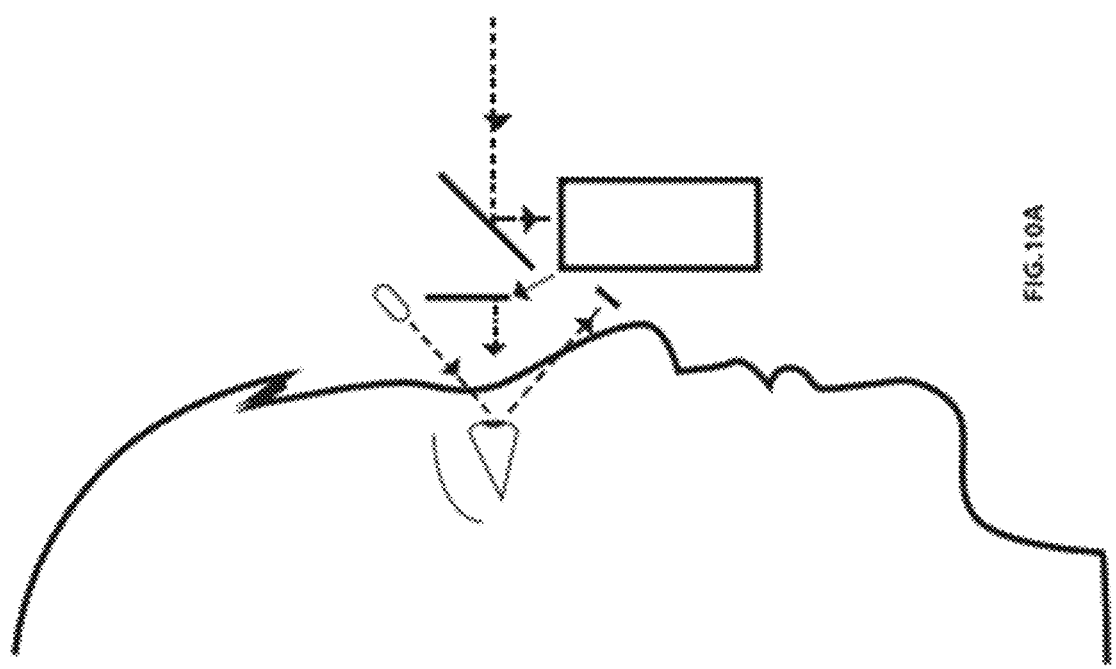

The word "exemplary" is used herein to mean "serving as an example, instance, or illustration." Any embodiment described herein as "exemplary" is not necessarily to be construed as preferred or advantageous over other embodiments.

The following description is intended to convey a thorough understanding of the embodiments described by providing a number of specific embodiments and details involving methods and systems for managing content submission and publication of content. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

The present disclosure describes a novel type of system and method to assist by optical means, thanks to wearable equipment, a runway person in guiding a drone's flight mechanisms during landing and take-off procedures (to and from airports, aircraft carriers etc.) through performing coded moves of their arms and hands.

The runway person (21) disposes four subsystems: locator (1, 2), reader, interpreter, and transmitter (2), working in cooperation with the drone's corresponding 4 subsystems in exchanging optical signals.

The runway-person (21) wears in front of their right eye an eye-tracker device (1) complete with a camera normally focusing frontwards to the drone fuselage's (11) front tip (8), disposing a semi-transparent frontal window-device conferring double reception (of the drone's image) by the eye (direct) and by the camera; on their right shoulder a combined 2-optical transmitter (2) device (6) rests on a hinged rod (4) and is connected on the left with the eye-tracker (1) through another hinged, thin, horizontal, 15 cm (7) long rod; it emits 2 distinct optical signals directed (13) parallel to the runway-person's (and the camera's) line of vision (12) towards the drone (11), the 2 signals being: one, a narrow-angle laser-quality signal, and the second one a wider-angle signal; eye-tracker and double transmitter constitute the locator.

Elements electronically sensing their coded moves, worn in proximity to their skin, constitute the "reader", a device personal to each runway-person, complete with a unit at hand distance, where the move signals are received/elaborated.

Alternatively to this, a small camera (14) receives hand signals, supported at breast level by a 3-arm system (15) resting at their waistband (16); it retracts at moments of maintenance or while off service, and can be positioned lower to read other members' moves. Another alternative, depending on runway's resources, is a camera (18) receiving the runway-person's coded moves and theirs only, positioned at the right distance and at a suitable height (20) on a small vehicle (19) rolling on the runway steadily in front of them and following them by tele-command (and automatically if needed), thanks to a system detecting their attitude while they stare at the drone (11), either rolling, ready to liftoff, or flying, ready to land. Finally the runway-person (21) disposes an "interpreter", a subsystem transforming the move signals into electric signal packs, e.g. Kinekt or a house-composed one, in company with a personal interpreter, a unit assimilating the particular runway-person's way of executing the coded-signal moves. The "transmitter" subsystem is the locator's transmitter-part.

2. The drone (11) also disposes 4 optical/electric subsystems: locator (8, 10), reader (10), interpreter and transmitter (8); these cooperate with those of the runway-person's. The fuselage's (11) front tip (8) disposes the central locator with 2 optical signal transmitters: a red, wide-angle signal, and a yellow-green, narrow-angle one; on its left a 15 cm long (7) "lever", the external locator lever (9), is hinged, bearing at its tip a camera with 2 optical sensors (10): a narrow-angle and a wide-angle one; the 2 transmitters—2 sensors combination constitutes the drone's locator. The lever's (9) hinge connecting to the fuselage tip (8) allows 2 revolving moves: one, round the fuselage's longitudinal axis, and the other round a vertical axis. The lever's (9) free end (10) revolves round its curved axis and accommodates the external locator (10), i.e. the 2 optical signal sensors.

The lever's (9) 3 possible attitudes are: the inactive position (9"), when it revolves back, round the vertical axis, to be embedded into the curved fuselage surface, 11, in a recess matching its shape, with no resistance to air while in flight; the deployed position (9), horizontal and perpendicular to the fuselage's longitudinal axis); and the activated position (9'), horizontal and perpendicular to the runway-person's (21) line of sight (12) towards the fuselage tip (8), whatever the drone's course of flight and angle of incidence. The lever (9) has 3 micro-arrangement mechanisms and bespoke sensors: first, a sensor of horizontality helps the lever (9) stay horizontal in deployed position (9) by revolving round the drone's longitudinal axis; second, a sensor device at the lever's tip (10), detecting the runway-person's optical signal (13), helps the already-horizontal lever (9) come to a right angle to this signal's direction (13) in activated position (9') by revolving round the vertical axis; and third, the same device helps the camera at the lever's tip (10) focus on said signal (13) by revolving round the lever's axis. The drone also disposes software in interpreter's role, elaborating the commands-instructions sent optically and transforming them into electric signals towards bespoke activators moving the flight elements: wings etc. Finally, the (locator's part) narrow-angle transmitter at the fuselage tip (8) is the drone's transmitter.

3. When the runway-person operates at a distance from the guided drones, without direct view of them, there is certain complementary system disposed in front of the runway-person and some corresponding one on the runway or on the aircraft carrier's deck, enabling contact and the ensuing exchange of commands between the 2 parties, guiding (21″) and receiving one (11). In front of the runway-person (or "tele-guiding person") 3 appliances are disposed: a monitor with touch display (26), positioned at hand distance on top of a desk (26′), to show an action's point and direction and to touch at that point for further effects; a joystick (28), to direct activities' vectors; and a keyboard (27), to send coded commands. On the runway (and the taxiway) ground there are embedded a number of series (or "rows") of optical compound camera (30)-and-transmitter (29) elements (31), the "mediums", arranged at distances along the runway (34), each series disposed transversally on it, facing the lot of drones (on the ground or in the air). Each such row of mediums (31) enters service in turns, just as the monitored/guided drone (11) passes over the previous such series, either taxiing in landing or in liftoff, thus leaving no part of the runway without control.

Each medium (31) is embedded (33′) in the runway ground, protruding slightly over its surface (34). It is protected by a strong metallic cover (33) to withstand heavy overpassing aircraft, with windows (33′) offering free view on both directions of the runway.

Each medium (31) has a camera (30) and a double optical transmitter (29) (emitting a wide- and a narrow-angle optical signal) disposed at same height, distanced by 15 cm (7), the camera (30) focusing (and zooming) on the left of the transmitter (29) and parallel to its optical beam direction.

A mechanism turns camera and transmitter (29, 30) in tandem as a unit horizontally towards the runway's 2 directions and vertically up and down to focus on the incoming drones. On the runway ground (34) there is a central electronic appliance in a safe place, the "medium-central", a 2-way mediating transmitter wired to all the mediums of the runway-and-taxiway and communicating wirelessly with the tele-guiding person's equipment; it assigns every [tele-guiding person-to-drone] connection to a concrete medium amid a concrete row of mediums, and further to another one in a consecutive row of mediums, as the rows alternate following the progress of a drone taxiing over them.

4. The process of guiding a drone through landing or take-off phase goes step-by-step: The runway-person (21) stands on the runway staring frontally at the drone (11) and the runway-taxiway; their line of vision (12) is directed in searching mode towards the front tip (8) of a particular drone's fuselage (11) as well as towards other drones.

The drone's electronic (AI) unit, ready to land or to liftoff (as ordered to or as programmed), turns on the central locator's (8) wide-angle red optical signal and activates its external locator lever into deployed position (9): frontal, transversal, horizontal, presenting low air resistance in landing, due to velocity being lowered.

The runway-person (21), being available or ordered thereto, spots the red signal (8), turns into frontal attitude staring at the drone (11) and turns on the locator-transmitter's (2) wide-angle optical signal parallel (13) to their line of vision (12).

The drone proceeds as follows: it receives, through its external locator's (10) wide-angle receiver, the runway-person's optical signal (13); it activates the external locator (10) detecting the direction of the incoming signal (13); it puts the lever (9) to activated position (9′) (horizontal, perpendicular to the incoming signal's direction) and turns the camera at its end (10) to focus on the direction of the incoming signal (13); it activates the software authenticating the exchange of signals; it turns on the central locator's (8) yellow-green, narrow-angle optical signal, directing it (12) to the runway-person (21), parallel to said incoming signal (13); and it turns off the red wide-angle optical signal (8).

From this moment on, a rectangle is formed in space by the following 4 lines (12, 1-2, 13, 9′): the runway-person's (21) line of vision (12) towards the drone's fuselage (11) tip (8); the horizontal distance of 15 cm (7) between the runway-person's (21) eye tracker (1) and transmitter (2): frontal, perpendicular to said line of vision (12); third, the runway-person's (21) narrow-angle optical signal, directed (13) parallel to said line of vision (12), towards the drone's (11) receiver at the lever's tip (10); and said lever's 15-cm dimension (9′), horizontal, perpendicular to the incoming (13) optical signal from the runway-person (21).

The runway-person (21) spots the drone's (11) yellow-green optical signal (12); turns on (2) the narrow-angle locating optical signal (13), to lock the contact, and turns off the wide-angle one (13); activates reader/interpreter/transmitter (2)/and software for control and authentication of the following optical transmission of commands; and executes them for liftoff or landing.

The reader is the above described sensors-worn system; alternatively the waistband-supported one (14) or the runway-rolling one (18) may serve instead. Hand signals are performed in packs and optical signals are controlled through an authentication process and are sent alike in packs.

The drone's (11) AI unit receives the commands in optical form through the reader (8) and passes them through the interpreter and the authenticating software in electric form; in case of positive control, it passes them to actuators and further in mechanical form to flight mechanisms; in the opposite case the transmitted packs are repeated till their controls is positive.

Both parties' narrow-angle optical locator signals stay on till the process ends. At the end of the liftoff/landing phase the runway-person (21) and the drone's (11) AI unit deactivate locator/reader/interpreter/transmitter, and the drone retracts the lever (9′) to inactive position (9″) in its recess in the fuselage's (11) outer skin.

In case the optical contact (12, 13) between the 2 parties (21, 11) and the authentication procedure are discontinued (if aircraft or personnel pass through, if electrics fail, etc.) the drone (11) turns on (8) the red wide-angle light and off the yellow-green one, and waits for re-establishment of contact, offering first option to the same runway-person; the particular runway-person (21) also repeats the locating process starting with their wide-angle optical signal and, as soon as contact is on again, last completely transmitted pack is controlled and transmission is resumed; if optical contact (12, 13) is cut off but authentication is not, a warned technician takes control in cooperation with the runway-person (21).

In case more than one runway-persons, being available, spot a drone's (11) red, wide-angle optical signal (12) and activate their wide-angle locating lights, the drone's AI unit chooses randomly (thanks to bespoke software) one of them, directs there (12) its yellow-green, narrow-angle light (8), turns off the red light (8), and so on.

In case a runway-person (21) spots more than one drones' waiting-mode red, wide-angle lights, they choose one of them (11) and, staring at it (12), activate their wide-angle light (2) for locating, and so on. The rest of the drones remain in waiting mode; if waiting for landing, they keep in automatic flight on reserve flight paths, collision-avoidance systems being activated, their red wide-angle light staying on, in waiting-mode.

The contact between the 2 parties can be extrapolated to a situation whereby there is a greater distance between them: the runway-person (21') (the "guiding person" now) works out of the runway, in control room premises (25), and a couple of phases in this process are slightly altered. Through the room's (23) window they (21') have full view (12') of the drone (11) and the runway-part for it to be taxiing on; they stare (12') at a drone's (11) red light (meaning waiting mode) at its fuselage tip (8), activate the locator's (2) wide-angle optical signal (12', 12) parallel to their line of vision (13), and so on for locating, locking the contact and transmitting hand signals till completion. Both parties (21', 11) dispose the equipment described above; the reader is the sensors-worn system or alternatively the waistband-supported one (14), but not the runway-rolling one (18) due to lack of space.

The double refraction that light rays undergo while travelling through windowpane glass (24) does not appreciably transpose them parallel-wise; the 4 lines (guiding person's vision (12), their signal's line to the drone (13), and the 2 parties' 15-cm (7, 9') horizontal distances) still form a rectangle.

5. The runway-person's work place can be further extrapolated to a situation whereby there is not direct view between the 2 parties, their being guiding the drone from any premises (25), any distance; this alters considerably a couple of the process detailed: the runway-person ("tele-guiding person" now) (21") disposes in front of them the 3 complementary devices (26, 28, 27) (monitor, joystick and keyboard), acts on them with their hands, and has optical contact with the monitor's touch display (26); on the other end, the drone (11) communicates optically with the multitude of runway (34)-embedded (33) compound camera-transmitter elements (31), one of them at every moment; the intermediate contact between the tele-guiding person's 3 complementary devices (26, 27, 28) and directly their interpreter on one part, and the runway-embedded elements (31) on the other part, is by radio, coded, secure. In this way, the monitor (26) shows what the runway-embedded camera (30) focuses on, and inversely the runway-embedded transmitter (29) emits optically what the tele-guiding person's (21") reader receives (optically) from their body members' moves (channeled through the interpreter), along with the activating commands from the 3 appliances (26, 27, 28). The process phases are thus: the tele-guiding person, seated (21) in HQ (25), spots on the monitor (26) a drone's (11) red optical signal (8) in waiting mode and finger-presses the monitor's touch display (26) at the image of the fuselage tip (8); in response, the embedded transmitter's (29) wide-angle optical signal is directed to the drone: to the external locator's sensor at the lever's tip (10); the drone's (11) AI unit detects the incoming signal and its direction, puts the lever (9) to activated position (9'), turns on the yellow-green, narrow-angle optical signal (8) towards the embedded camera (30), deactivates the red signal (8) and activates the contact-authentication software; in response, the monitor (26) shows the yellow-green signal; the tele-guiding person (21") spots the signal, turns on their narrow-angle optical signal through the keyboard (27), turns off the wide-angle one, activates their reader/interpreter/transmitter/authenticating software subsystems, and proceeds in executing the commands-corresponding hand moves; the reader detects the commands; these pass subsequently through the interpreter, are radio-transmitted to the runway-central, further wired to the assigned embedded element (31), pass to its transmitter (29) and are sent optically from this to the drone's sensor; in response this sensor passes them to the drone's interpreter which sends them in electric form to the actuators of the flight mechanisms.

Transposition of the transmission's assignment from one embedded element (31) to another between the consecutive series of embedded elements (31), as drones speed over each one of them, is done automatically and the tele-guiding person intervenes only in emergency cases, e.g. overall-system overcharge. In case they have direct view over a part of the runway, they can take control optically over the liftoff-landing process phase corresponding to that part.

6. A piloted aircraft's security and flight procedures during landing and similar procedures can be bettered without needing to involve the pilot, thus diversifying the craft's guiding possibilities, by adopting the above detailed technology. The pilot assigns their optical equipment as described above for use by the drone, cooperating with runway-embedded devices as described, the tasks of locating and of receiving hand signal-form instructions coming from a tele-guiding person, equipped with their 2 systems, optical and complementary, for take-off or landing, especially for the latter due to distance and low visibility. The automatic pilot or the pilot themselves eventually executes the received instructions.

7. Further, complementary body member moves, meant to ease the guiding of an unmanned aircraft's flight mechanisms during landing and similar procedures, can be adopted: the guiding person either uses their body members as working elements, or has such elements at hand; moves of the guiding person's body members other than hands and arms are effected, monitored and transmitted; they activate (by image or sound) corresponding contacts and electric circuits or a camera, reader-wise; they produce coded signals far outnumbering the existing range of such, so meeting the rising need for new commands in drone aviation. The body members move buttons and levers, manipulating them to generate signals, or move themselves in company of held-or-attached objects for maximizing signals' readability; and a wearable software unit interprets the signals and changes their form. Such moves, and such members, are: the whole head and its parts (eyebrows, eyelids, glancing to various directions); the mouth area and sounds; the torso and lower body; and all 10 fingers pressing and turning buttons and levers in hand-held devices, joystick-like, all this while also performing hands-and-arms' standard moves.

C General Analysis

1 Concise

1a The invention consists in a novel system and an efficient process, both intended to offer a human guiding party the possibility to effectively guide a flying receiving party lacking a human piloting force (an automatic system of a drone, and other flying units, e.g. an airliner's autopilot) through take-off and landing procedures, more importantly in the latter.

1b The guiding party's hand signals, bodily gestures so far used to guide piloted aircraft through these 2 procedures, are interpreted electronically into electric signals for internal elaboration, then reversely reformed into optical signals and finally transmitted as such to the drone's receiving systems to be processed and executed; alternatively, transmitted to a regular airliner's autopilot equipped with suitable optical subsystems; on the part of the receiving party (a drone, an autopilot, etc.) the received optical signals are interpreted back into electric signals and fed as such to actuators in order to (in succession): initiate contact, sustain it, authenticate it, perform take-off/landing, and finally terminate contact.

1c the guidance can be given at a runway of an airport, of an aerodrome or of an aircraft carrier, or even at the roof of a specially converted land vehicle or sea vessel whatever, since drones possess highly praised STOL capabilities; normally the guidance is effected the receiving party being in the guiding party's line of view (cf H., i. below), but a system is proposed for potential guidance while it being on virtual view (cf J. below).

2 Equipment

2a Both the guiding party and the receiving party dispose an artificial intelligence (AI) unit and bespoke software to achieve the best outcome of the guiding process's 2 phases: departure from base and return to this or another base.

2b On the part of the guiding party, the human intellect does the decision work and the eye sight does a camera's part of it; they dispose 4 subsystems, in sequence of activation:

the locator: the eye tracker (1) which traces the optical line of contact;

the reader, in 2 separate apparatuses: one of them (14, 18) receives the guiding party's own gestures as optical signals; the other one receives the receiving party's (the drone's) signals;

the interpreter: transforms the gestures into electric signals, works on them, and reversely transforms them back into optical signals; and the transmitter (6): sends the optical signals to the drone's systems.

2c on the part of the receiving party every unit similarly disposes 4 subsystems, same as the above in designation and function, differing in actual operation: locator (8, 10, reader (again, 10), interpreter and transmitter (again, 8).

The 4 subsystems of the involved 2 parties are described in the following. In all, the flyer disposes: a light-sensing (10) and a light-emitting system (8), both double: wide- and narrow-angle; a small AI unit (hardware, flight software, guiding parties database, mission's program); and actuators for these and for flight elements; this all is meant to handle:

—the general progress and success of the mission, and concerning the 2 phases in question, the right reception, elaboration and execution of the guiding signals, and efficient feedback.

2d The human factor enters here; each one of current (and future) runway-persons has (and is assumed to potentially have) different hand-and-arm dimensions and differs imperceptibly in the way they execute gestures; thus each one interprets personally the intended signals-to-be into gestures with minute characteristics (unintentionally) differing in ways such that a malfunctioning set of electronic sensors cannot accurately discern them and thus falsely interprets them into wrong signals (while actual pilots are not mistaken and surmise correctly);

2e so there arises the need of a "personal interpreter" system discerning, quantifying and smoothing (either minutely or grossly) differing gestures into standard moves; this is personal for each runway-person, to follow them in their interaction-with-machine, and teams up closely with the guiding party's interpreter sub-system.

2f The described all-embracing system concerns the optical-electric-optical process for guidance on the part of the guiding party and the optical-electric-mechanic one on the part of the drone.

Parallel to this, the 2 parties also dispose means for radio contact (transponders, RC system etc.) to be used in case of bad weather obstructing free vision; this is not a matter for the present description.

3 Process

3a The here-presented process of optical guidance ensures during the guiding party-to-receiving party transmission:

the initial condition of waiting mode, the successful first optical contact, its exclusiveness versus third parties, its uninterrupted continuation for guidance, the exchange of hand-signal commands in optical form, and the termination of the contact.

3b Accordingly, during the receiving-to-guiding party transmission, it ensures: the waiting mode, the feedback for making the contact, the authenticating algorithm and the progression of the signals to the actuators.

3c Considering that an instantaneous wrong interpretation potentially leads to a near miss, often leading further to a complete failure (cf A.3. above, i.1. below), and given the ever increasing number of unmanned aircraft small and big and the recent trend to assign everything to autopilots in airliners, the present system and method constitute a value added to current technology and practice.

Besides:

the runway-person is not restricted by their particularity of arm dimensions and their personal differences in performing bodily gestures in their way to optically interpret the intended commands-to-be (in case these are transmitted to a non-human flying-unit's-central-unit);

the personal interpreter system minimizes the time wasted in acquainting the receiving drone with the performing particularities of the runway-person's, and the gesture-to-signal-to-transmission-to-execution translation times are also minimized;

Importantly, the notion of the guiding party's position becomes flexible: it is not bound to be on the runway, since guidance signals can be sent from anywhere: office, headquarters (HQ), vehicle, another plane, etc.

4 Choice Between Alternatives

Due to the particularity of the 2 involved parties and of the proposed systems, certain elements need definition:

the guiding party's eye tracker is worn on the left or the right eye;

accordingly, the transmitting antenna lies further on the left or on the right, and the receiving party's reader is situated on the left or on the right of the transmitter;

the distance between the guiding party's eye and their transmitting antenna, equal to the receiving party's distance between reader and transmitter; and radio or optical contact (and what kind of it) is adopted between the 2 parties.

5 Conventions

5a Concerning the above initial uncertainties this presentation assumes the following:

the eye tracker is worn on the right eye and the transmitting antenna lies further on the right; accordingly, the drone's reader is on the right of the transmitter transmitting antenna and guiding party's right eye are 15 cm distant; accordingly, the drone's fixed transmitter is 15 cm on the right of its reader; and from the start, optical signals are more direct and less intercept able compared to radio contact; optical contact is non-diffusive, not subject of interference, and it is readily applicable for using the guiding party's vision.

5b Visible light has been selected in this proposal; where a concrete color is mentioned, red and yellow-green have been chosen. Where no mention of color is made, plain white is meant. Where narrow-angle light beam is mentioned, a laser-quality is meant. No other colors, and neither IR or UV part of the spectrum have been opted in to in this presentation (cf G.1a.A. below).

5c Other priorities may tend to favor radio contact, though, in which case it is better to adopt a transmission jumping between scattered narrow channels in high frequencies; importantly, radio equipment is comprised in both parties' equipment, additionally to the optical one described here, in order to cope with weather conditions unfavorable to optical contact: foggy, snowy, micro particles suspended in the air, etc.; it is not a matter for this presentation, though.

D Locator 1 1a Both the guiding and the receiving party have the capacity to change location, but once they are available or ordered to, they can locate one another at any moment and make for an authenticated, non-interrupting contact.

1b To this end, both the guiding and the receiving party have small optical appliances to operate inclement weather (and additionally radio ones for inclement one), with wavelengths selected out of a wide range of the optical spectrum, based on needs and conditions (in this presentation, visible light has been decided upon); the 2 parties dispose compatible emitting (transmitters) and receiving units (sensors) between them (cf G.1a. below).

1c In this chapter, the locators' operation concerning the first inter-parties contact and the exchange of optical signals is described.

1d The guiding party bears one sensing device (1) in front of their eye and 2 emitting ones (2) on the shoulder; the drone bears 2 emitting devices (8) at the nose of the fuselage and 2 sensing ones at the end of a lever connected to this nose (10); these are described in the following articles.

2 the Runway-Person Disposes:

2a a locator-sensor device (eye tracker) (1) detecting their sight direction (towards the receiving party, the drone), supported in front of the right eye, hanging from a helmet or soft cap: it emits a harmless, low-power laser beam at eyebrow-level, directed to the moving iris where it reflects; a sensor at inferior height scanning the 2D-moving reflection infers the 2D-moving sight direction at every moment and forwards it to the following device, the locator-transmitter (cf 2b. below);

2b a system (5) emitting a laser beam (2) (or another, equally narrow-angled light beam) to a direction exactly parallel at every moment to the scanned line of vision reported by the previously described device (1) (cf 2a. above), being adjustable through activating a mechanism (6);

the system is connected to the eye tracker (1) through a thin horizontal metallic link (3), the emitting point being 15 cm distant from the eye (7), lying at eye-level; the system has a protruding higher part to shelter from the rain and rests on a short strut (4) standing on the right shoulder; and 2c another system emitting from the same point (2) as the one described (cf 2b. above) a light beam with wider emission angle, its central line being directed similarly.

2d Additionally, they dispose a button system in one of their hands, between the fingers, which helps them disengage momentarily the optical contact in case some emergency occurs.

2e The mechanism mentioned (6) (cf 2b. above) revolves the transmitter of the 2 light beams (2) (cf 2b., 2c. above) in 2 dimensions to match the inclination (azimuth) and horizontal angle of the guiding party's vision direction (12) towards the drone.

2f In order to discern the locating signal of a far distant drone (and all the signals coming from it for that matter), the vision-tracking device disposes at its front surface a quite-transparent area connected to a light-amplifying device (5), situated at 1 cm to the right of the eye, transposable to the left just in front of the eye via pushing a button.

2g It is noted here that the runway-person also disposes some additional means to ascertain contact in case of foggy, snowy or other light-restraining weather conditions (cf C.5c. above); these means, of radio frequency or other, are positioned at 2 points corresponding and close to the ones described for light-based contact: the sensor (1') 2 cm below the eye-level (1), the transmitter (5') 2 cm below the optical transmitter (2) (this is a first proposal, but these 2 positions are not necessarily the only candidate ones, since the radio technology is not strictly direction-dependent).

3 the Drone Disposes:

3a a central-locator device (8) at the foremost point of the fuselage emitting 2 light beams:

3 a.A a red light which can be seen from a quite wide angle, and 3a.B a yellow-green light of very narrow emission angle (laser or similar), steerable on 2 dimensions (up-down and left-right); this light beam is of adequately narrow angle (cf H.10b. below) in order for the drone to be capable to select a runway-person among several ordered to stand on the runway to serve the take-off and landing procedures, without causing interference to other runway-persons standing thereby; and 3b an external-locator device (10) which lies at the extreme part of a 15 cm long, curved metallic attachment (the "external locator lever") (9) and disposes 2 adjacent light sensors:

3b.A one of them receives in wide angle the 2 light beams described in 3a.A and B and disposes a device detecting their direction; and 3b.B the other one receives (in narrow angle) the guiding signals of the take-off/landing procedure.

3c The external locator "lever" (9) (cf 3b. above) connects to the fuselage nose (8) through an articulation, which is steerable round the foremost point of the fuselage nose (through 2 adjusting mechanisms operating onto the articulation), in 2 turn directions:

one, swiveling round this point on a plane perpendicular to the fuselage axis, and the other, in a semi-circle on a plane passing from the fuselage axis, the turn ranging front (9) (in deployed position)-to-rear (9") (in inactive position); and 3d the lever (9) has a swivel-type articulation at its tip (10), allowing its extreme part (which bears the 2 external locator sensors) to swivel round its axis, controlled by a mechanism; it swivels continually while in deployed position (9) (cf 3e.B below) and stops in activated position (9') (cf 3e.C. below) in such a way as to have the 2 sensors (10) disposed in exact orientation towards the guiding party (in reality, towards their laser transmitter) (2), all this, whatever the drone's flight direction and pitch/roll angles.

3e The 3 positions of the external locator lever are inactive, deployed and activated:

3e.A in inactive position (9") (when off the 2 flight phases of take-off and landing) it is kept back (revolving to this position thanks to the 2 turning possibilities mentioned in 3b.C) in hidden mode contacting with the drone's outer skin, embedded there in a recess expressly shaped to match the lever's form, in such a way as to have its external surface blend evenly into the fuselage's perimeter (11) (the lever's outer curvature matching exactly that of the drone's outer surface);

3e.B in deployed position (9) the external locator lever is in waiting mode on the left of the fuselage nose (the drone-observer's vision presumably being directed towards the drone's front) or thereabouts, always in horizontal position thanks to a sensor and to the 2 adjusting mechanisms (cf 3c. above), irrespective of the inclination of the drone's fuselage and wings, that is its pitch and roll angle respectively, and of its direction of flight; and 3e.C in activated position (9') the external locator lever is horizontal and perpendicular to the guiding party's line of vision (12) towards the drone's nose (8) (and transmitter), thanks to a sensor and to the 2 adjusting mechanisms (cf 3c. above), whatever the flight direction and the drone's attitude; that is, the 15 cm-long lever (9') is parallel to the 15 cm distance (7) between the runway-person's eye tracker (1) and their shoulder-supported laser transmitter (2); this leading, finally, to the following quadrilateral's being a rectangle: line 1 (7): the horizontal distance of 15 cm between the runway-person's eye tracker and their laser transmitter, supported on their shoulder (cf D.2b. above), line 2 (12): their line of sight towards a drone's fuselage nose, line 3 (9'): the drone's nose-adjacent 15 cm long horizontal external locator lever, and line 4 (13): the straight line between the drone's light sensor and the runway-person's laser transmitter, which is parallel to the above (line 2) line of sight (12) (cf D.2b. above).

3f In the light of the foregoing description (cf 3b., 3e.B. and 3e.C. above), the straight line connecting the 2 locator devices, central (8) and external one (10) (light emitting and light sensing respectively), measures 15 cm between the 2 locators (8, 10), is disposed horizontal in both positions deployed (9) and activated (9'), and is disposed perpendicular to the guiding party's line of vision (12) towards the drone's nose (8), in the activated position (9').

3g Like the runway-person, the drone disposes additionally a radio-exchange means (cf 2g. above) situated together with the corresponding optical devices: the radio emitting device at the drone's nose and the radio receiving one at the external locator lever's tip (but again not necessarily, the radio technology not being strictly direction-dependent).

E Reader 1 1a The reader devices of both the guiding and the receiving party are, for the optical technology described here, light-beam signal-receiving devices for mutual exchange of signals; in parallel the guiding party disposes a reader (14, 18) receiving (rather, detecting) their own hand signals, the main novelty of the present invention. The reader feeds the received hand signals in electronic form to the interpreter to be electrically elaborated.

1b The radio signals-receiving device used in both parties for exchange of signals in unfavorable weather conditions in the locating process (cf D.2g., 3g. above) also serves as a reader.

1c In the following, the light signals-receiving devices are described. In paragraphs 2 to 5 the guiding party's hand signals-reader is described; article 2a in particular details their reader meant for signals coming from the drone; and the reader of the receiving party is described in paragraph 6.

1d Paragraph 3 details a reader system receiving electric signals and forwarding them as such to the interpreter, whereas paragraphs 4 and 5 deal with reader systems receiving optical (video or high-rate consecutive photos) and sending them in electric form to the interpreter.

2 The guiding party disposes a reader for their hand signals, either electro-registering (in paragraph 3. below) or video-registering the moves of their members (in paragraphs 4. and 5. below), and another for the drone's signals. 2a The latter is normally served by the runway-person's vision (1), but since the signals are coded for the sake of brevity, it is possible to incorporate a camera with suitable software in the locator in front of their eye, operating through the light-amplifying device (5) for a distant flyer's signals (cf D.2f. above); anyhow, the receiving party's signal output is small compared with the guiding party's one: it consists mainly in reception certification feedback and secondarily in reporting extraordinary facts occurring in reception or in flight.

2b The guiding party's reader meant to register their own hand signals is a personal apparatus for each runway-person, since it is set together with the interpreter and their personal interpreter (cf C.2e. above). The equipment is one of the following 3 types of apparatus (in 3., 4. and 5. below).

2c The members performing the signals to register are the person's hands, forearms and arms of both sides; their number may (and is surely bound to) increase in future practice (cf K.6. below).

3 A bodily-worn set of sensing devices, embedded into the garments of the runway-person's uniform, serves as reader to register the person's hand, elbow and arm moves and further transmit the information to the interpreter; it consists in devices of 2 kinds:

those embedded in the person's garments at the level of and adjacent to the upper body joints of interest (middle finger knuckle, wrist, elbow and shoulder of both sides) and magnetically or electrically yielding their position at any moment, and those embedded in the garments or belt-worn and receiving the magnetic or electric signals from the former in order to infer the position of each member: the positions of any 2 adjacent joints yield the inclination of the member (hand, forearm, and arm) outlined by this pair.

The connection between the former and the latter is wireless but may be wired in order to avoid interference between runway-persons neighboring on the runway.

4 4a A device (14) doing a camera's work, kept in front of the runway-person (21) wherever they move around, receives optically and registers the moves of their members, thus serving as an alternative solution for the function of a reader.

It is supported at waist level (16) through 3 thin, straight, telescopically extendable struts (15) which do not lie in the same plane and thus constitute a support system which is sturdy enough; the struts rest on the waistband (16), 2 of them on side points A and B and the third one on the front point C, and extend up and frontward, inclined and converging towards a point D (14') at 60 cm in front of the chest, 10 cm lower than the neck. Considering that point D (14') does not belong to the plane of the 3 points A, B and C (16), this fact assures the system's stability.

4b The camera-like device (14) is wide-angle (17) and rests at point D (14'); it takes video at rates between the normal at 70 fps and a slow rating around 4 fps, to change at will at any moment; the reception angle (17) can take shots of hands extended to any direction and the focusing function encompasses all hand positions and distances from camera, even when extended in front. The camera connects with or without wire to the interpreter system, transferring the video taken.

4c When idle, the support system retracts telescopically to the 3 waistband points A, B and C (16), the 3 thin struts (15) disconnecting and folding on the waistband A, B AND C ((16), the camera disengaging and being put in a bespoke case or in a pocket.

5 An appliance (18) rolling on wheels (19) on the airport or aircraft carrier runway, kept in front of the runway-person (21) and taken along by them wherever needed, bearing a camera or other motion-detecting means staring at them, is a plausible alternative solution for operating as reader for their own hand signals.

The guiding party (21) stays on the runway facing the drone (11) (either flying or waiting on the runway) and the reader (18) is disposed in front of them at a distance of about 2 m; wherever the guiding party (21) moves, the reader (18) moves accordingly; it keeps rolling through wireless telecontrol or automatically, in the latter case detecting automatically their position and body attitude.

The camera rests at suitable height on the appliance's rolling sub-unit (19), on a vertical, telescopically extending strut (20) adjustable at will, and has a suitable wide-angle reception (17), capable to:

register the particular runway-person's hand signals, their hands being extended to any direction, and leave out other persons' members and signals, even adjacent runway-persons' ones.

6 For the receiving party the reader (10) is a light-beam signals-receiving device situated at the tip of the curved 15 cm-long lever (9) articulated at the nose (8) of the fuselage of the drone (cf D.3b. above), together with the external locator's light sensors; it operates either through the sensor described in D.3b.B. above, or independently, depending of the technology adopted.

F Interpreter

1 The interpreter sub-system of both the guiding and the receiving party receives electric signals from the reader and transforms them to an accredited signal configuration acceptable from the overall drone force, receivable by every unit, coded for secrecy in a different way for each force entity, further to deliver them in their new form to the transmitter to be transmitted to the other party. It functions through the AI unit and disposes suitable software for the task.

2 The interpreter of the guiding party is inherently in connection with the reader; the combined reader-interpreter system is the runway-person's basic combined piece of equipment for the novelty that constitutes the present invention.

The interpreter is based on one of the existing systems in the market (Kinect, Leap Motion, Oculus Rift or Google Glass), tailored to register from close-up; or it is made expressly for the present project with proprietary specifications, confidential (not open) design, continuous updated/debugged versions, potentially based on the available systems but not infringing.

3 Each runway-person carries/wears, additionally to the interpreter and between this and the reader, their "personal interpreter" (cf C.2e. above); it detects forms and patterns in the particular person's hand signals and helps smooth-out micro-differences in the ratified way of executing the hand signal-form of signals-to-be, for the drone's AI unit or an airliner's autopilot to acknowledge (whereas a pilot's eye and intellect do not need assistance to this end).

It takes a learning period to bring the personal interpreter to a satisfying level of pattern recognition; if and when an instant distraction causes an unclear, unrecognizable signal to be done, the personal interpreter warns with a flash or a sound for repeating clearly.

4 The interpreter of the receiving party (the drone) is a piece of software which on one hand codes the (reception- and flight-relevant) electric signals received from the in borne AI unit to be forwarded to the transmitter and further (in optical form) towards the guiding party's systems (in the way of locator- and flight-relevant feedback), and on the other hand decodes the optical signals received through the reader from the guiding party to be forwarded (in electric form) to the AI unit and further to the actuators.

G Transmitter 1 1a Both the guiding and the receiving party have a pair of transmitting devices: 1a.A optical (cf C.5c. above): for the guiding party (2), plain light for the wide-angle beam and laser-quality light for the narrow-angle beam, and for the receiving party (10), red for the wide-angle beam and yellow-green, laser-quality light for the narrow-angle beam; but another, more efficient (both for emission and for reception) color may replace the yellow-green beam of laser quality and more broadly, either infrared or UV may replace the visible light if needs and conditions lean towards such technology in later versions; and 1a.B radio (cf C.5c. above) or other similar technology, efficient in bad weather and secure, instead of radio. The transmitters and receiver-sensors of the 2 parties (guiding and receiving one) are compatible between them (cf D.1b. above).

1b In the following, the transmitter's operation described concerns the first contact with the other party and the exchange of optical signals. In regular moments the signals are exchanged in raw form, just as they come from the interpreter to be sent; in moments of secrecy the interpreter composes a coded form of the signals and as such they are sent by each particular transmitter to the other party.

2 The transmitter of the guiding party (2) is in the same place with the laser transmitter of the locator (cf D.2b. above) and can possibly be the same, in this latter case thus working consecutively for the 2 tasks: first for locating the other party and thereafter for administering the execution of the take-off or the landing procedure.

3 The transmitter of the receiving party (8) is a device situated at the fuselage nose together with the central locator (cf D.3a.B. above), possibly being the same as that, performing 2 consecutive signaling works similarly as the guiding party's transmitter: first the locating part, then the take-off or landing procedure.

H Basic Procedure

1 Concerning the Runway-Person:

1 a Their regular attitude is as follows: for take-off, they stay on the runway facing the drone which is in waiting mode in view to taking off, or for landing, they stay on the runway-to-land-on, facing the still-flying drone ready to land, flying low at low speed towards them.

1b Their line of vision (12) is directed to the drone's fuselage nose (8), or to the nose of a drone among many being in waiting mode, coming and going between them, focusing on fuselage noses one after another.

2 Concerning the drone: Whenever the drone is ready to start or to finish its mission (its time of flight), being so ordered (by RC) or so programmed (in its in borne mission schedule), —it turns on the wide-angle red light (8) (cf D.3a.A. above), and—deploys its curved external locator lever from inactive position (9''') (where it stays during flight and also while staying idle on the runway) to deployed one (9), transversal and horizontal (if in landing phase it undergoes no air resistance since the speed is not excessive) and puts the lever's tip (10) in swiveling motion so that the wide-angle light sensor (cf D.3b.A. above) is in capacity to receive any searching-activating light that may emerge in the surroundings.

3 Concerning the Runway-Person:
  they are in position to spot the red light (8), being available or being assigned-ordered thereto,
  they turn their body (21) (or just their line of vision) so that they stare frontally at the particular drone's nose (8), and
  they activate their locator's wide-angle light beam (2) (cf D.2c. above), directed towards the drone's external locator (10) (D. 3b.A. above) on a line parallel to their line of vision (12), in waiting mode.

4 Concerning the Drone:
The drone's AI unit proceeds with the following actions:
  it receives the guiding party's light signal (2) with its wide-angle light sensor of its external locator (10) which swivels in waiting-receiving mode,
  it stops the swiveling motion of the (external locator lever's tip, bearing the) external locator (10) in such an angle as to have the wide angle light sensor directed (13) towards the source (2) of the incoming light signal (towards the guiding party),
  it activates its external locator's (10) system detecting the guiding party's position,
  it puts the (external locator's) lever (9) in activated position (9'), in perpendicular attitude to the detected line (13) between the external locator (10) and the source of the light signal (2), and always in horizontal attitude, and keeps adjusting the lever's attitude during the following part of the process,
  it turns the lever tip's (10) position so that the (external locator's) narrow-angle light sensor (cf D.3b.B. above) be directed to face the light source (2) (the guiding party),
and keeps adjusting the swiveling tip's attitude during the following part of the process,
  it activates the software that shall authenticate the ensuing exchange of signals,
  it turns on the (central locator's) (8) narrow-angle yellow-green light signal (cf D.3a.B. above), directs it in a line (12) parallel to that (13) of the narrow-angle light sensor, as above, towards the guiding party (1), similarly as above keeping adjusting this direction,
  it activates the AI unit's software for reception of signals for the take-off/landing guidance, and
  finally, it turns off the wide-angle red light (8).

5 Beginning from this moment on, 4 lines form a rectangle (cf D.3e.C. above); these are:
  the horizontal 15 cm distance (7) between the runway-person's eye tracker (1) and their laser transmitter (2), supported (4) on their shoulder (cf D.2b. above),
  their line of sight (12) towards the drone's fuselage nose (8),
  the drone's nose-adjacent 15 cm long (horizontal, activated) external locator lever (9'), and
  the straight line (13) between the drone's light sensor (10) and the runway-person's laser transmitter (2), which is parallel to the above line of sight (12) (cf D.2b. above).

6 Concerning the Runway-Person:
  They spot the drone's yellow-green light signal (8),
  they turn on (2) the narrow-angle locating beam (cf D.2b. above) in order to lock the contact between the 2 parties,
  they turn off (2) the wide-angle light signal (cf D.2c. above),
  they activate their reader (−, 14, 18), interpreter and optical transmitter (2) systems as well as the software meant to authenticate the ensuing exchange of signals, and
  they execute the coded bodily (hand, forearm and arm) moves relevant to the ensuing take-off or landing process, which are instantly detected through one of the 3 proposed (cf E.3. to 5. above) alternative reader appliances (−, 14, 18), then are elaborated electrically in the interpreter and reverted back into optical signals to be optically transmitted to the receiving party; transmission is pack-configurated, similar to the internet's pack-transference technology, each pack being controlled for authentication by the 2 parties' systems;
  at the same time, during the whole of the guidance process, they keep staring at the drone concerned in order to keep steady the contact with its systems: in case an instant distraction occurs and their vision is bound to deviate, a button system in their hand (between 2 fingers) helps disengage the contact and re-engage it later at an opportune moment (cf D.2d. above).

7 Concerning the Drone:
  It receives optically the guidance signals (2) from the guiding party, passes them through the interpreter and (in electric form) through the authenticating software, and further to the bespoke actuators in case the authentication turns positive, whereas in the opposite case a signal (an optical one) is sent for the last (optical) pack of the transmission to be repeated;
  light (8) (cf D.3a.B. above) and deactivates its locator (8, 10), reader, interpreter and (optical) transmitter, and
    brings back the external locator lever (9') to inactive position (9") into the waiting recess of its outer skin (cf D.3e.A. above) where it blends exactly with the fuselage's external curvature.

8 Finally, Concerning the Runway-Person:
  at concluding the take-off or landing procedure, they turn off the narrow-angle light signal (2) (cf D.2b. above) and deactivate their locator (1, 2), reader, interpreter and optical transmitter systems.

9 9a In the light of the above, both parties' locator subsystems stay active until termination of the take-off or landing procedure through their narrow-angle light beams: that of the guiding party (2) (cf D.2b. above) and the yellow-green one (8) of the receiving party (cf D.3a.B. above).

9b In case the contact is interrupted for some reason (passing personnel/vehicle/aircraft, battery or capacitor failure, etc.), the optical transmission authentication turns negative or inexistent, the drone turns off the narrow-angle yellow-green light beam (8) and turns on the wide-angle red light beam (again, 8), with option to re-establish contact with the same runway-person as guiding party, the runway-person repeats location process through activating the wide-angle light beam (2), and at contact being re-established, the corresponding software controls former reception, seeks last successfully transmitted pack, and resumes transmission.

9c In case the optical contact is interrupted and the authentication process is not (or goes awry), an operator based in a technical center is warned and takes care of the situation in cooperation with the runway-person.

19

10 10a In case several (available) runway-persons spot a drone's wide-angle red light beam ((8) and all of them simultaneously turn on their respective wide-angle light beam (2) in waiting mode (cf 3. above), the drone's AI unit selects through bespoke software at random one of them (in reality, one of their light beams) (2) and directs to that runway-person the narrow-angle yellow-green light beam (8), at the same time turning off the wide-angle red one (again, 8);

10b this is the reason for the narrow-angle beam to adequately be such: on one hand the AI unit is thus capable to select one among many persons, all standing on the runway in anticipation as ordered, and on the other hand transmission lines of neighboring guiding parties are not confused by interference.

11 In case a runway-person spots more than one red lights (8) of drones' locators in waiting mode, especially for landing, they select one of them according to estimation and, staring at its nose (8) (rather, turning in order to face the drone's nose), they activate their wide-angle light beam (2) in view to establishing the location part of the landing procedure (or of the take-off one) (cf 3. above); the drone considered receives the light beam (2>10), stops the lever's swiveling tip, (10) etc., activates the lever (9'), etc., turns on the yellow-green light beam (8), and so on (cf 4. above, etc., all that); the other drones stay in waiting mode, either on the ground (or on the ship's runway or the taxiway) or further flying in eights, their red light still on (8).

i Re-Stationing

1 It has been seen (and bemoaned) that runways where drones have been introduced become all the more congested; the situation turns crammed full of people and aircraft of any size, making for a dangerous place in overdose if and when human error or material failure occurs (cf C.3c above).

Thanks to available technology the guiding parties, "guiding persons" from now on (not "runway-persons" anymore), can be seated in safe premises and still perform their task, giving instructions optical-signal-wise to drones/autopilots for take-off and landing, with the same (if not better) degree of promptness, clarity and security.

2 The options put forward for such premises are primarily the control room of an airport/aerodrome/ship (22), or the round-view seat of a specially converted boat/vehicle instead, with a STOL-qualified roof; the guiding persons are seated or standing (21') in a row in front of windows, having a clear line of view both on the drones in waiting mode (on the taxiway in view to taking off, or in the air in view to landing) and on the runway; or, a group of guiding persons, conveniently seated with view on the taxiway, is assigned the take-offs and another group, also placed in a convenient post for their own task, is assigned the landings.

3 Similar to the basic procedure detailed in the foregoing (H. above), each guiding person focuses their line of vision (12') on the fuselage nose of a particular drone emitting their red wide-angle light (meaning waiting mode), emits their wide-angle light (2) parallel to their sight, spots the yellow-green light turned on by the drone, turns on the narrow-angle light (again, 2) replacing the other one, turns on their subsystems (reader etc.) and executes the bodily motions while seated, and the drone's light beams (8), external locator lever (10), subsystems and software are performing as detailed in the foregoing; it is noted though that the guiding person's reader is either the bodily worn kind (cf E.3. above) or the waistband-supported camera (14) (cf E. 4. above), whereas in the basic procedure described in the foregoing all 3 potential alternatives can serve (cf H.6. above); this is due to insufficient space.

20

4 4a Both the guiding person (21') and the drone (11) dispose the equipment already described. The windowpane material, a thin sheet of glass, transposes (in parallel) passing-through light rays and laser due to double refraction (entering, exiting) by about half a millimeter (24) which does not appreciably deteriorate the line of vision and that of optical signals.

4b Like in the basic procedure (cf H.5. above), the eye tracker-to-locator transmitter distance of 15 cm (7) is horizontal, equal to the drone's nose-to-lever tip distance and parallel to it in its activated position (9'); thus these 2 distances form a rectangle together with the following 2 straight lines (cf D.3e.C. above):

the guiding person's line of vision (12) towards the drone's fuselage nose, and the straight line (13) between the drone's light sensor and the runway-person's shoulder-borne laser transmitter, parallel to this line of vision (cf D.2b. above).

4c In the light of this and of the non-deteriorating quality of the windowpane material concerning the line of vision (cf 4a. above), the locator's work is always successful in the present situation of the guiding persons performing inside the premises of a control room.

J Tele-Guidance

1 The notion of the guiding party's position can be disconnected from the one of the clear and unobstructed view of the drone, if the technology can help them take one step farther from the receiving party.

The first step is being re-stationed (21') (cf i. above) vs the basic procedure (21, 11) (cf H. above). The now-considered second step takes the guiding party to whatever premises is convenient for the management of drone flights from the double viewpoint of:

overall systematization of collaborating drone units (or groups), and of guiding parties closely collaborating with decision centers.

2 The best option for such premises is primarily the integrated room space of a decision-making and flight-management center, either decentralized or in HQs, but also the interior space of an airborne mission-organizing center, or whatever space-turned-HQ is deemed plausible.

3 A tele-guiding unit in such a system comprises 4 sub-units (rather than the 2 described so far, guiding and receiving party), detailed in the following paragraphs 3a to 3d; the first and second sub-units (cf 3a., 3b. below) communicate in the basic way described in the foregoing, between guiding party and reader, while the third and fourth sub-units (cf 3.c., 3d. below) communicate optically. The new element here is the electronic (wireless) communication between the second and the third sub-units (cf 3b., 3c. below). The 4 sub-units are:

3a The guiding party (21") (here, the "tele-guiding person", tg.p.), equipped (along with bespoke radio devices to operate in bad weather, not to be dealt with here) with the set of optical devices described in the foregoing (cf D.2. above): an eye tracker system (6), a light-amplifier (5), and 2 laser or light beam emitters (2) (wide- and narrow-angle ones), accompanied by a mechanism adjusting the 2-dimension-angles while moving the combined 2-emitter device, and by a disengaging button.

3b A set of appliances (26, 27, 28) situated in front of the tele-guiding person (21") on top of a table (26') at a convenient height, which are: a monitor with touch screen (26), a keyboard (27), and a joystick (28) (or possibly 2, for both hands) of special form, with the usual 2-dimensional command, 5 additional finger-buttons around the shaft, and a push-analog thrust-in move.

3c In front of the line of the drones in waiting mode, parallel to it, there lie deployed a number of parallel rows of "mediums" (31), combined 2-transmitter-and-camera (29, 30) elements arranged at equal distances along each one of the rows, and a central electronic 2-way transmitting unit, the "medium-central", mediating between the mediums and the tele-guiding person's equipment, all described in the following (cf 4. below).

3d The receiving party (the drone, 11), equipped (along with radio devices, not to be described here) with the set of optical devices described in the foregoing (cf D.3. above): a pair of laser or light beam emitters (8) (a red, wide-angle one, and a yellow-green, narrow-angle one), and 2 light sensors (10) (a wide- and a narrow-angle ones), accompanied by the external locator lever (9) and its 2 mechanisms (one of them moving the lever in 2 radial directions, the other one turning the lever's tip).

4 Concerning the Mediums (31):

4a Each group of mediums in a row are disposed lined-up either on the taxiway (or the runway) on the ground or on a sea vessel (or on any surface bound to serve for take-off/landing), on a line transversal to the runway, being properly protected and rendered accident-free (cf 5. below), or at the inside of a windowed wall of a control room, at a convenient place and height in order to have perfect view of the drones and of the necessary, short anyhow, combined taxiway-runway space, since drones are generally STOL-qualified. In an airport and on an aircraft carrier with plenty of runway space there are several such rows of mediums situated at regular distances along the runway; each row in its turn enters service following a taxiing drone's progress along the runway and overflying the rows sequence; in this way the whole length of the runway is monitored and controlled concerning the take-off or landing procedure. Each such row of mediums (31) enters service in turns, just as the monitored/guided drone (11) passes over the previous such series, either taxiing in landing or in liftoff, thus leaving no part of the runway without control 4b Each medium (31) disposes 3 optical appliances: a camera (30) (in the combined role of a locator and a reader) and 2 light-beam transmitters (29) on its right (staring at the drones-line), one of laser quality and the other with wider angle, both emitting from the same point (29), their common transmitted-beam axis being parallel to that of the camera (30) (corresponding to the camera's intersection of the 2 display diagonals) and at a horizontal 15-cm distance (7) from it 4c Each medium (31) also disposes a 2-part mechanism capable of revolving it round 2 axes (a horizontal one, parallel to the camera-to-transmitters distance, and a vertical one) and of micro-adjusting these 2 moves; in the revolving move round the vertical axis the 3-appliance set (31) is supported on a horizontal circular ball-bearing (32), itself resting firm on the base (runway or other); Concerning the combined revolving move of the medium (31) round the 2 axes:

4c.A the set's vertical-radial revolution (round the horizontal axis) allows it:
to follow the ever rising and widening angle of the incoming drone as it flies or taxies close, and
to keep on the guidance procedure on the drone as it progresses on the runway, at the same time the camera zooming accordingly;

4c.B the horizontal revolution (round the vertical axis) also lets the set follow the drone's progress and is simultaneous with the vertical one.

4d The combined 2-part mechanism allows the transmitter (29) to send optical signals to the point of origin of an activating signal (keeping in account the 15 cm distance) that the camera (30) spots, through the mediation of the tg.p.'s combined activities: reception of electric signal, spotting the point, staring at it or pressing a button or pressing at the display, detection of this fact, and transmission of electric signal.

4e The medium-central is an electronic appliance being in electrical contact (wired) with the whole of the mediums on the runway and the drones' taxiway, and communicating both wirelessly with the tele-guiding person's (21") 3 complementary appliances (26, 27, 28) (cf 3b. above) and direct with their interpreter; it mediates between these 2 sub-units and is situated in a safe place close to the runway, out of the drones' (and the bigger aircrafts') taxiing path; it also effectuates the assignment transposition of the mediator's role (between tele-guiding person, 21", and drone, 11) between a concrete medium of a concrete row of mediums and another medium of a consecutive row, as a taxiing drone (11) progresses in flying over successive rows.

5 In case the row of mediums lies on the taxiway/runway on the ground (34) (at an airport or an aerodrome) or on a sea vessel's deck (an aircraft carrier or other ship), even on the roof of a converted land vehicle or of a converted small boat (in this case disposing one medium (31) on each one of the 2 sides of the STOL-runway-converted roof), 5a each medium (31) is encased in a circular protective metallic box (33) situated in a small cylindrical recess dug into the (runway's) ground (34), the (ship's) deck, or the (vehicle's) roof, such as to protrude slightly above the surface, conveniently for the camera (30) and the 2 light-beam transmitters (29) to shoot efficiently;

5b this box (33) on one hand protects the confined appliances from the drones taxiing above it prior to take-off or following landing and bumping over it, and on the other hand it is meant to avert any damage on the taxiing drones' rolling system and thus any malfunction of the take-off and landing processes.

5c The upper surface of the enclosing metallic box (33) is either flat, in which case a retracting mechanism sinks it momentarily down to runway surface level in unobstructed mode, activating thanks to sensing zones parallel to the mediums row, embedded in the runway on either side of the row of mediums, at a distance of about 5 m (a first estimation, to be reassessed if needed), or it is non-sinking, convex (33), its circular fringe (35) extending further out of the recess's circular brim, in a concave outer circular part configuration, resulting in a very smooth protuberance above the runway surface.

5d The metallic box has 2 openings (33') corresponding to the 2 opposite directions of incoming guided drones (those taking off and the landing ones), duly protected by the horizontal visor-wise geometry of the box material; the openings (33') are of an adequately wide-and-high angle of free view in order to allow the transmitters (29) and the camera (30) to get full view of the incoming drones and of the runway on both (opposite) directions. A ball-bearing (32) inside the metallic box supports the medium and permits it to revolve round its vertical axis.

5e Considering that drones and even major airliners taxiing on the runway overpass the place, the metallic construction of the box is adequately strong and fail-safe; also considering that a drone taking off or landing speeds as needed, the camera (30) zooms accordingly fast; and the horizontal revolution (round the vertical axis) of the medium (31) supported on the ball-bearing (32) becomes full circular, thus allowing them (their 3-appliance set) to turn 180° rapidly, changing direction in order to follow (with the camera only) the progress of a drone coming and going frontally, that has overrun the place of the medium and passed instantly on the other side of it.

6 6a From the moment a drone overruns the place of a medium, only the camera can follow working, while the transmitters of the medium become obsolete (unless sensors and transmitters similar to those installed at the drone's nose are also installed at its rear; this would bring excessive complexity to the situation, though). At that moment the assignment to keep on mediating in the procedure to guide the drone passes to another medium (31), in a consecutive row of mediums, suitably situated down-traffic, and when the drone also overruns this, on to another medium and so on till final take-off or landing.

6b The re-assignment is either done automatically each time thanks to the 2 sensing zones parallel to (on either side of) each and every row of mediums (cf 5c. above), on command from the medium-central (cf 4e. above) managing the entire procedure, or it is done manually on the part of the tele-guiding person, in case overcharge of the system is witnessed, thanks to software sensing each time that the guided drone's signal has touched the border of the display of the monitor disposed in front of the guiding person (cf 3b. above).

6c In one of the consecutive assigned places for tele-guidance the work may be executed through optical guidance from the control room (i. above) if the guiding person's position (21') so allows.

7 Concerning the Sub-Procedures of Tele-Locating and Tele-Guiding:

7a The monitor (26) in front of the tele-guiding person (21") displays the video taken from the scene in front of the medium's camera (30), and the medium's 2 optical transmitters (29) execute the commands (emission of laser/light beams) coming from the appliances in front of them (the tg.p.): touch display (26), joystick (28) and keyboard (27) (cf 3b. above).

7b Concerning the tele-guiding person (tg.p.): they spot the red light (8), wide angle, of a drone in waiting mode, in the touch display (26); they stare at that point and their eye tracker (1) detects it, or alternatively, they press with their finger at that point on the touch display (26); the medium's camera (30) on the runway turns/focuses at that point; the medium's wide-angle light beam (29) is directed-transmitted parallel to the camera's line of focus, in 15 cm distance from it, towards the drone's external locator (10); 7c Concerning the drone: its AI unit detects through the wide-angle sensor (10) the optical signal from the tg.p. (in reality, from the medium), turns on the yellow-green laser-light (8) directed towards the tg.p. (in reality, towards the medium's camera), parallel to the received beam, turns off the red light (again, 8), and activates the lever (9'), the reader, the interpreter, the authentication software and the transmitter (8); the medium's camera (30) tracks the yellow-green laser-light; the tg.p.'s touch display (26) displays it.

7d Concerning the tele-guiding person: they spot the yellow-green laser-light in the touch display (26); using the keyboard, they turn on the medium-transmitter's laser-light and off its wide-angle light beam; they activate reader, interpreter, personal interpreter, authentication software and transmitter; as was mentioned in the description of the procedure using the re-stationing technology (cf i3. above), it is again noted that the guiding person's reader is either the bodily worn kind (cf E.3. above) or the waistband-supported camera (1) (cf E. 4. above), whereas in the basic procedure described in the foregoing all 3 potential alternative readers can serve (cf H.6. above).

Further on, the tele-guiding person starts executing the hand signals through performing bodily moves or some joystick (28) moves replacing as many bodily ones (or replacing more ones, thanks to coding them by using the joystick's 2 analog commands, 5 button signals and one deep-push; or they may use 2 joysticks for easier execution) (cf 3b. above).

The reader detects the moves and the transmitter sends corresponding electric signals to the medium's transmitter (29) which sends corresponding optical signals to the direction of the drone's reader-sensor (10), it being tracked every moment, continually, by teaming operation of the medium's camera (30) and transmitter (29).

7e Concerning the Drone:

it receives the optical signals of guidance and executes them; in this manner the respective take-off or landing process takes place and concludes.

7f Parallel to this optical-electric-optical guidance on the part of the tele-guiding person and optical-electric-mechanic response of the drone, the parties also dispose means for radio contact in case of bad weather, which is not matter for the present description.

8 The described tele-guidance process also serves piloted aircraft in case the pilot assigns the autopilot, rightly equipped with the optical equipment described above, the procedure of landing or take-off, that is the sub-procedures of location (making the contact) and transmission of commands.

K Further Possibilities

1 The described systems and methods are meant to help out the procedure of guiding unmanned flying systems through the phases of take-off and landing by hand signaling and optical exchange of commands, a location phase coming first, the esoteric elaboration and interpretation from sub-system to sub-system of the runway-person or of the flyer being done through electric technology.

2 The flyer can be a drone or a piloted airliner's automatic pilot, if the airliner is accordingly equipped with optical appliances as described in the foregoing (cf D., E. above mainly, and F., G. secondarily); but even with the pilot fully active, the task can be assigned by them to the system here described: the locating phase takes place using the technology here described and following the procedure described (cf H., i., J. above) prior to exchange of signals, mainly for landing, and then communication with exchange of any surplus signals can take place as usual-so-far, between runway-person and pilot.

3 Recently a technique (or techniques) and the corresponding technology (systems, resources, etc.) are researched concerning the exchange of guiding instructions and commands through mental, non-physical means, using electrodes embedded in or juxtaposed on the head inside a helmet (or a bonnet), by detecting brain waves and their electronic interpretation into commands, and the application of it all onto aviation at large.

4 In the light of this, and relative to the present invention, the supremacy moment is the following experiment: the guiding party, equipped in the way described in the foregoing (cf J.3a. above) and disposing electroded in the skull (cf 3. above) and bespoke software, mentally passes guidance signals to an intermediate appliance (a "mental reader") in the style detailed in the Tele-guidance chapter (cf J.3b. above) but without bodily gestures, these signals being transmitted in the ensuing phases to the receiving party (cf J.3d. above) through electronic intermediate transmission to the medium (cf J.3c. above), no double meaning being intended. Such experiment is in the realm of current research, soon to be in that of actual practice.

5 For the moment being, the use of certain quite-physical (non-mental) means is proposed here, in order to meet the need for extra (supernumerary) guidance signals, more than the hand-and-arm gestures can execute (or just in case coded signals are needed, non-readable by third parties, thus more elemental signals are needed), since the numbers of drones are in the increasing and new flight functions continuously arise in the field; such means are, first, gestures of extra members and parts of the body (cf 6. below), possibly with objects held or attached in order to enhanced visibility and thus readability, and secondly the use of electric circuits and buttons, manipulated to produce signals and commands.

6 The range of possible uses of members and gestures is quite large; the members performing the standard signals have been so far the person's hands, forearms and arms of both sides; novel use of body parts and novel gestures, moving or sounding, subsequently to be detected optically or acoustically, are as follows: the whole head and head parts moving, like eyebrows raised/knitted, blinking an eyelid, or casting a glance to various directions; moving parts of the mouth area, like contact of teeth, of tongue, swallowing, lips smiling/protruding/producing sounds; uttering specific sounds; and speech itself; all 10 fingers pressing and turning buttons and levers in hand-held devices, joystick-like; moves of the torso, of the lower body, and of further bodily joints (especially hand knuckles and neck).

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system to facilitate the landing of drones including an eye tracker, an interpreter, and a control system configured to be worn by a person that performs coded moves of their arms and hands during a drone landing operation, the eye tracker recognizing the line of sight of the person with respect to a drone, the interpreter identifying coded moves performed by the person during landing of the drone, and the control system generating a signal to cause a transmitter to rotate into a position so as to establish a direct optical communication link to the drone to which is sent information relating to the identified coded moves, wherein the eye tracker is coupled to a camera and includes a semi-transparent frontal window-device that facilitates the person looking directly at the drone using a naked eye in one mode, and looking at a camera view in another mode.

2. The system of claim 1, wherein the eye tracker is coupled to the camera via a reflective mirror, the reflective mirror is configured to reflect an image in the eyeball view path of the person in the direction of the camera.

3. The system of claim 1, wherein the signal transmitted via the direct optical communication link includes information which instructs an on-board control system in the drone on actions it should take in-flight which will stir the drone during landing.

4. The system of claim 3 wherein the system also facilitates the takeoff of drones, and wherein the signal transmitted via the direct optical communication link includes further information which instructs the on-board control system in the drone on actions it should take during take-off.

5. The system of claim 1, wherein the signal transmitted via the direct optical communication link includes information which instructs an on-board control system to fly in the direction of the source of lights detected by the drone while in landing mode.

6. The system of claim 1, wherein the sent information is in a form adapted to be processed by an auto-pilot system on the drone.

7. The system of claim 1, further comprising a device for navigating the landing of the drones, to comprising:
    means for receiving video showing incoming drones over a landing space;
    means for identifying a user selection of a drone to be provided assisted landing; and
    means for receiving the signal from the control system to cause the transmitter to rotate into a position and establish the direct optical communication link to the drone to which is sent information relating to the coded moves.

8. The system of claim 7, wherein the signal transmitted via the direct optical communication link includes information which instructs an on-board control system in the drone on actions it should take in-flight which will stir the drone during landing.

9. The system of claim 8, wherein the device also navigates the takeoff of drones, and wherein the signal transmitted via the direct optical communication link includes further information which instructs the on-board control system in the drone on actions it should take during take-off.

10. The system of claim 9, wherein the signal transmitted via the direct optical communication link includes information which instructs the on-board control system to fly in the direction of the source of lights detected by the drone while in landing mode.

11. The system of claim 10, wherein the signal is in a form adapted to be processed by an auto-pilot system on the drone.

12. The system of claim 1, wherein the drone is configured to:
    identify a transmitted light from a ground source generally directed in the direction of the drone during landing;
    acknowledge the transmitted light;
    establish a direct optical communication link with a ground source; and
    decode information received over the direct optical communication link to assist the drone in landing.

13. The system of claim 12, wherein the drone is adapted to include a wide-angle view camera to receive the information to be decoded.

14. The system of claim 12, wherein the drone is adapted to include an onboard navigation system that executes the coded moves received over the direct optical communication link.

15. The system of claim 14, wherein the onboard navigation system is an auto pilot system which automatically adjusts the navigation systems on the drone in response to the executed coded moves.

16. The system of claim 15, wherein the auto pilot system is also configured to automatically adjust the navigation systems on the drone so as to perform take-off under instructions sent over a different direct optical communication link established with the ground source for that purpose.

17. The system of claim 14, wherein the ground source is an aircraft carrier and the landing of the drone by the auto pilot system is configured to land the drone on the aircraft carrier.

18. The system of claim 12, wherein the acknowledging of the transmitted signal involves at least one of broadcasting an RF signal, flashing a light detectable by the ground source, or communicating a coded signal to the ground source via the direct optical communication link.

19. The system of claim 12, where the drone is of the type having an assigned ID which is transmitted to the ground source when acknowledging receipt of the transmitted light.

* * * * *